US010867206B2

(12) United States Patent
Albayrak et al.

(10) Patent No.: US 10,867,206 B2
(45) Date of Patent: Dec. 15, 2020

(54) CONTENT BASED SEARCH AND RETRIEVAL OF TRADEMARK IMAGES

(71) Applicant: ADER BILGISAYAR HIZMETLERI VE TICARET A.S., Istanbul (TR)

(72) Inventors: Abdulkadir Albayrak, Istanbul (TR); M. Elif Karsligil, Istanbul (TR); I. Onur Sigirci, Istanbul (TR)

(73) Assignee: ADER BILGISAYAR HIZMETLERI VE TICARET A.S., Istanbul (TR)

( * ) Notice: Subject to any disclaimer, the term of this patent is extended or adjusted under 35 U.S.C. 154(b) by 105 days.

(21) Appl. No.: 16/093,939

(22) PCT Filed: Apr. 14, 2016

(86) PCT No.: PCT/TR2016/050111
§ 371 (c)(1),
(2) Date: Oct. 15, 2018

(87) PCT Pub. No.: WO2017/180072
PCT Pub. Date: Oct. 19, 2017

(65) Prior Publication Data
US 2019/0114505 A1   Apr. 18, 2019

(51) Int. Cl.
*G06K 9/62* (2006.01)
*G06F 16/583* (2019.01)
(Continued)

(52) U.S. Cl.
CPC ........... *G06K 9/6212* (2013.01); *G06F 16/53* (2019.01); *G06F 16/5838* (2019.01); *G06K 9/44* (2013.01);
(Continued)

(58) Field of Classification Search
CPC .. G06K 9/6212; G06K 9/6215; G06K 9/4652; G06K 9/44; G06F 16/5838; G06F 16/53; G06T 7/77; G06T 7/194
(Continued)

(56) References Cited

U.S. PATENT DOCUMENTS

2013/0084000 A1* 4/2013 Bhardwaj ............ G06K 9/6215
                                                         382/165
2016/0034773 A1* 2/2016 Goncalves ........... G06K 9/4609
                                                         382/103
(Continued)

*Primary Examiner* — Ayodeji O Ayotunde
(74) *Attorney, Agent, or Firm* — Birch, Stewart, Kolasch & Birch, LLP

(57) ABSTRACT

A method, system, and computer product are provided for efficiently and accurately searching and retrieving trademark images based upon a query image. In one embodiment, a method for content based search and retrieval of trademark images includes extracting color features from a plurality of trademark images by generating, with a processor, a 64-bin color histogram for each trademark image using 6-bit color data for each pixel of the trademark image. The 6-bit color data includes 2 bits from each of a red, green, and blue channel for each pixel of the trademark image. The method further includes extracting shape features from a plurality of trademark images by generating, with the processor, a 9-bin orientation histogram for each trademark image using weighted orientation angle data for each pixel of the trademark image. The method further includes generating, by the processor, a distance similarity measure between the color histograms and the orientation histograms of two trademark images.

27 Claims, 12 Drawing Sheets

(51) Int. Cl.
*G06T 7/194* (2017.01)
*G06T 7/77* (2017.01)
*G06F 16/53* (2019.01)
*G06K 9/44* (2006.01)
*G06K 9/46* (2006.01)

(52) U.S. Cl.
CPC ......... *G06K 9/4652* (2013.01); *G06K 9/6215* (2013.01); *G06T 7/194* (2017.01); *G06T 7/77* (2017.01); *G06T 2207/10024* (2013.01); *G06T 2207/20182* (2013.01)

(58) Field of Classification Search
USPC .................................................. 382/162, 165
See application file for complete search history.

(56) References Cited

U.S. PATENT DOCUMENTS

2018/0114091 A1* 4/2018 Xu ..................... G06Q 50/184
2018/0373960 A1* 12/2018 Xu ..................... G06K 9/6202

* cited by examiner

CONTENT BASED SEARCH AND RETRIEVAL OF TRADEMARK IMAGES

TECHNICAL FIELD

The present invention relates generally to image recognition, and more particularly to content based search and retrieval of trademark images.

BACKGROUND

A trademark is typically a name, word, phrase, logo, symbol, design, image, or a combination of these elements to identify the products or services of a particular source from those of others. Thus, trademarks may include very different types of lines and colors to form words, shapes, patterns, and/or logos. Trademarks are applied for and registered around the world in different countries' government agencies that examine and approve of trademark applications. Often to apply and to be approved for a trademark, a search is conducted to check if similar registered trademarks exist.

Content based image retrieval, or visual search, is the task of retrieving digital images from a plurality of images that are similar with respect to the visual characteristics of some query image. Visual search technology affords several advantages over traditional keyword search. Importantly, it allows users to search for images in collections that have not been tagged with descriptive metadata and to search with an image rather than text, which may be a much richer query than a sequence of keywords.

However, in order to use images for search, image processing is performed to extract, identify, or otherwise recognize attributes or features of the images. At present, accurate and efficient search methods and systems have not been available that return quality matching trademarks with sufficient speed. Thus, there is a need for an automatic, computationally-efficient, and accurate method and system for searching, matching, and retrieving images from a set of trademark images.

SUMMARY

The present invention addresses these problems by providing a highly efficient and accurate trademark image search and retrieval method, system, and computer product.

In accordance with an embodiment of the present invention, a method for content based search and retrieval of trademark images is provided. The method includes extracting color features from a plurality of trademark images by generating, with a processor, a 64-bin color histogram for each trademark image using 6-bit color data for each pixel of the trademark image, wherein the 6-bit color data includes 2 bits from each of a red, green, and blue channel for each pixel of the trademark image. The method further includes extracting shape features from a plurality of trademark images by generating, with the processor, a 9-bin orientation histogram for each trademark image using weighted orientation angle data for each pixel of the trademark image. The method further includes generating, by the processor, a distance similarity measure between the color histograms and the orientation histograms of two trademark images.

In accordance with another embodiment, a method for content based search and retrieval of trademark images includes providing a URL of a set of trademark images in a database, and receiving a query trademark image. The method further includes extracting color features from each of the trademark images, by a processor, the extracting of the color features including: applying a first filter to smooth the image; applying a second filter to remove background pixels of the image; concatenating 2 bits from each of a red, green, and blue channel to provide 6-bit color data for each pixel of the image; and extracting a 64-bin color histogram of the image using the 6-bit color data. The method further includes extracting shape features from each of the trademark images, by the processor, the extracting of the shape features including: converting the image to grayscale; applying a third filter to remove noisy pixels from the image; calculating a horizontal derivative and a vertical derivative for each pixel of the image; dividing the vertical derivative by the horizontal derivative to obtain a derivative quotient for each pixel of the image; calculating an orientation angle for each pixel of the image by calculating arctangent of the derivative quotient; dividing the image into 3×3 blocks; and extracting a 9-bin shape histogram for each block of the image using orientation angle data with weighted values to obtain an 81-bin shape histogram of the image, wherein the 9 bins of the shape histogram include 0-20 degrees, 20-40 degrees, 40-60 degrees, 60-80 degrees, 80-100 degrees, 100-120 degrees, 120-140 degrees, 140-160 degrees, and 160-180 degrees. The method further includes determining similarity between the query trademark image and the set of trademark images by comparing color features and shape features between the query trademark image and each trademark image of the set of trademark images using Bhattacharyya distance; and returning trademark images from the set of trademark images in an order according to Bhattacharyya distance.

In accordance with yet another embodiment of the present invention, a non-transitory machine-readable storage medium is provided that includes instructions that, when executed by one or more processors of a machine, cause the machine to perform operations as described above.

In accordance with yet another embodiment of the present invention, a system for content based searching and retrieval of trademark images is provided. The system includes one or more processors, and a color histogram module that configures at least one processor among the one or more processors to generate a 64-bin color histogram of a trademark image using 6-bit color data for each pixel of a trademark image, wherein the 6-bit color data includes 2 bits from each of a red, green, and blue channel for each pixel of the trademark image. The system further includes an orientation histogram module that configures at least one processor among the one or more processors to generate a 9-bin orientation histogram of the trademark image using weighted orientation angle data for each pixel of the trademark image. The system further includes a comparison module that configures at least one processor among the one or more processors to generate a distance similarity measure comparing the color histogram and the orientation histogram between two trademark images.

DESCRIPTION OF THE FIGURES

Methods, systems, and computer products for trademark searching and retrieval according to the invention and some particular embodiments thereof will be described with reference to the following figures. These and other features, aspects, and advantages of the present invention will become better understood when the following detailed description is read with reference to the accompanying drawings in which like characters represent like parts throughout the drawings. Some embodiments are illustrated by way of example and not limitation in the figures of the accompanying drawings. Unless noted, the drawings may not be drawn to scale.

DETAILED DESCRIPTION

Figure 1:
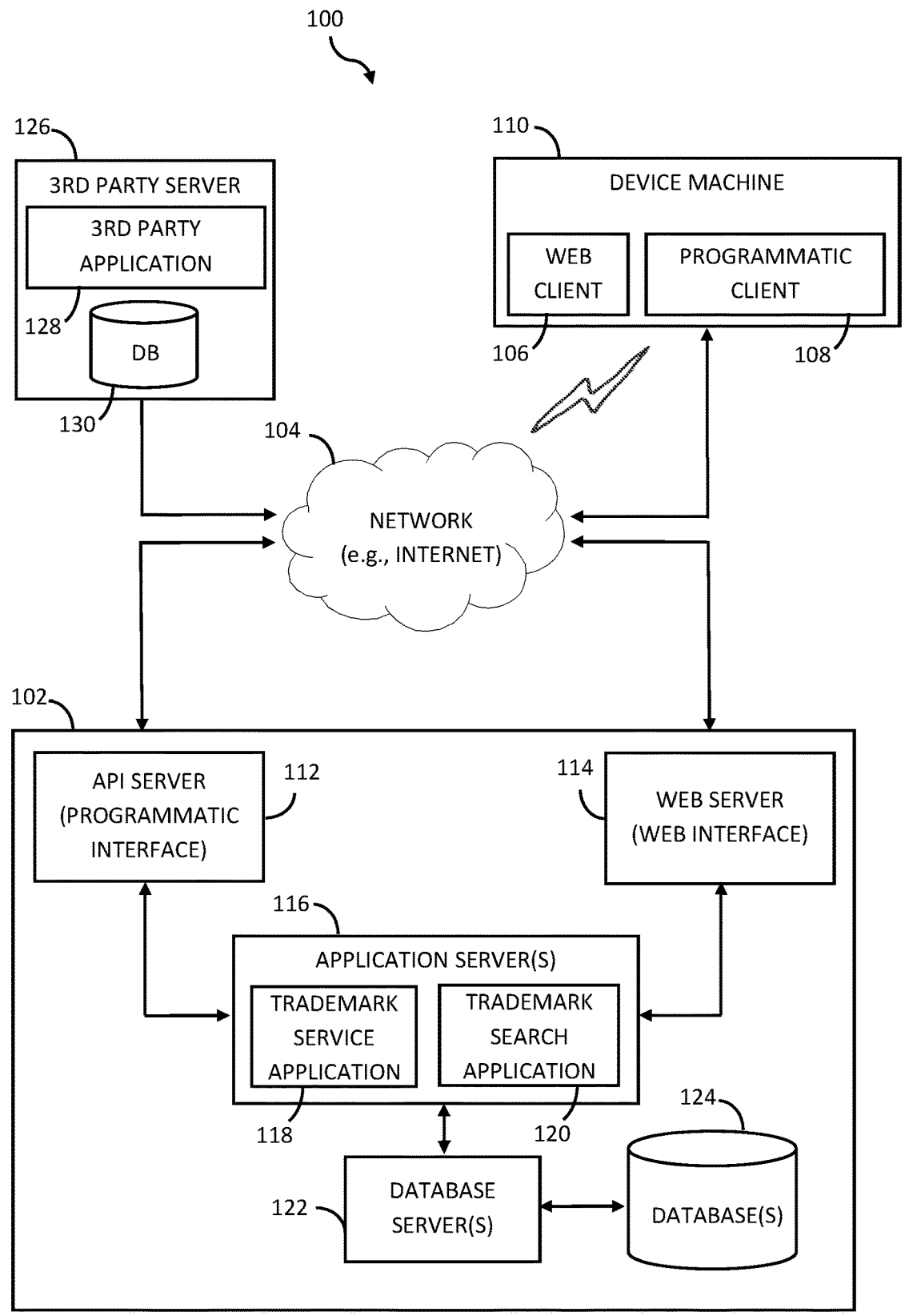
FIG. 1 illustrates a network diagram depicting an example system for performing image processing and using image feature data obtained from image processing according to some embodiments.

According to a general embodiment of the invention, methods, systems, and computer products for searching and retrieving "matched" trademark images based upon the content of a query image and a set of registered trademark images are disclosed. In accordance with an embodiment, a method for image similarity comparison and retrieval of companies' registered trademarks may include at least two stages: (1) calculation of image color feature similarity; and (2) calculation of image shape feature similarity.

In some embodiments, the image comparison, matching, and retrieval scheme operates as follows. An image database/collection is provided. For example, a uniform resource locator (URL) or website/webpage address of a folder which includes a set of images (logos, trademarks in an image database) is given to a trademark services and/or trademark search application to calculate the color and shape features of all images. Then, extracted features of the images may be stored in a database. Afterwards, a query/input image (logo, design, words, shapes, colors, and the like of interest to match or compare) is provided, and color and shape features are extracted from the query image. The color and shape features of the query image are compared to the registered trademark image features stored in the database and similarity measures between a given input image and the registered trademark images are calculated to retrieve the most similar images from the image database/folder.

In accordance with another embodiment, a method of searching trademark images includes extracting color features from a trademark image by generating a 64-bin color histogram of the trademark image using 6-bit color data for each pixel of the trademark image, wherein the 6-bit color data includes the most significant 2 bits from each of a red, green, and blue channel for each pixel of the trademark image. The most significant bits refer to the most representative bits that describe the color, and in one example will be the first 2 bits from each of the RGB channels. The method further includes extracting shape features from the trademark image by generating a 9-bin orientation histogram of the trademark image using weighted orientation angle data for each pixel of the trademark image. The method then includes generating a distance similarity measure between the color histograms and the orientation histograms of two trademark images.

Described in further detail herein is a method, system, and computer product for extracting image feature data from an input trademark image and various uses of the image feature data. Image feature data includes, but is not limited to, color histogram, orientation histogram, pattern identification, and dominant color corresponding to the input image. The query or input image may comprise a digitized photograph taken by a user to capture an image, such as at least a color and/or pattern, or an image included in a website or web page. The extracted image feature data is used to provide similar trademark images in a provided database that match the query image. In some embodiments, one or more sources are used to obtain sets of trademark images for comparison (e.g., registered trademarks from different national government agencies).

Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

FIG. 1 illustrates a network diagram depicting an example system 100 for performing image processing and using image feature data obtained from image processing for trademark image searching according to some embodiments. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on device machine 110. In one embodiment, the system 100 comprises a matching system, a recommendation system, and or a registration service system.

Device machine 110 comprises a computing device that includes at least a display and communication capabilities with the network 104 to access the networked system 102. The device machine 110 comprises, but is not limited to, remote devices, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Device machine 110 may connect with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Device machine 110 includes one or more applications (also referred to as "apps") such as, but not limited to, a web browser, messaging application, electronic mail (email) application, an e-commerce site application (also referred to as a marketplace application), a trademark search and/or registration application, and the like. In some embodiments, if the trademark application is included in a given device machine 110, then this application is configured to locally provide the user interface and at least some of the functionalities with the application configured to communicate with the networked system 102, on an as needed basis, for data and/or processing capabilities not locally available (such as access to a database of trademark images, to authenticate a user, to verify a method of payment, etc.). Conversely if the trademark search and/or registration application is not included in a given device machine 110, the device machine 110 may use its web browser to access a trademark service site (or a variant thereof) hosted on the networked system 102. Although a single device machine 110 is shown in FIG. 1, more device machines can be included in the system 100.

An Application Program Interface (API) server 112 and a web server 114 are coupled to, and provide programmatic and web interfaces respectively to, one or more application servers 116. The application servers 116 host one or more "trademark applications" (e.g., trademark service applications 118 and trademark search applications 120) in accordance with an embodiment of the present invention.

Application servers 116 may further include payment applications and other applications that support a trademark service. The application servers 116 are, in turn, shown to be coupled to one or more databases servers 122 that facilitate access to one or more databases 124.

The trademark service applications 118 may provide a number of trademark registration functions and services to users that access networked system 102. Trademark registration functions/services may include a number of trademark registration functions and services (e.g., provision of forms, laws, and/or information; data intake; image capture; payment, etc.). For example, the trademark service applications 118 may provide a number of services and functions to users for providing their trademark(s) (e.g., capturing trademark), registering their trademark(s) with a government agency, and offering services for sale (e.g., consulting, interfacing with the government agency to respond to any objections for the trademark registration, facilitating correspondence, and other services related to trademark registration). Additionally, the trademark service applications 118 may track and store data and metadata related to captured trademarks, transactions, and user interactions. In some embodiments, the trademark service applications 118 may publish or otherwise provide access to content items stored in application servers 116 or databases 124 accessible to the application servers 116 and/or the database servers 122.

The trademark search applications 120 may include a number of trademark search and retrieval functions and services (e.g., searching, reporting, review and feedback, and other services or functions related to trademark searching, etc.). The trademark search applications 120 may allow users to search a set or database of registered trademarks for similar images to a provided query or input image, which may be of interest for a potential trademark registration application in one example. The trademark search applications 120 may extract color and shape features from the query image and a set of searched images (e.g., registered trademark images), generate histograms corresponding to color and oriented gradients, and then compare the histograms between the query image and set of database images for close "matches". The set of searched images may be from database 124 or a third party server 126 having access to a third party database 130 (e.g., publicly available registered trademark images from various countries' government agencies that register trademarks). Additionally, the trademark search applications 120 may track and store data and metadata related to captured trademarks, transactions, and user interactions. In some embodiments, the trademark search applications 120 may publish or otherwise provide access to content items stored in application servers 116 or databases 124 accessible to the application servers 116 and/or the database servers 122.

While the trademark applications 118 and 120 are shown in FIG. 1 to both form part of the networked system 102, it will be appreciated that, in alternative embodiments, the trademark applications may form part of a trademark application service that is separate and distinct from the networked system 102 or separate and distinct from one another. In other embodiments, the trademark service applications 118 may be omitted from the system 100. In some embodiments, at least a portion of the trademark applications may be provided on the device machine 110.

Further, while the system 100 shown in FIG. 1 employs a client-server architecture, embodiments of the present disclosure is not limited to such an architecture, and may equally well find application in, for example, a distributed or peer-to-peer architecture system. The various trademark service and search applications 118 and 120 may also be implemented as standalone software programs, which do not necessarily have networking capabilities.

The web client 106 accesses the various trademark applications 118 and 120 via the web interface supported by the web server 114. Similarly, the programmatic client 108 accesses the various services and functions provided by the trademark applications 118 and 120 via the programmatic interface provided by the API server 112. The programmatic client 108 may, for example, be a trademark services application to enable users to capture images and/or manage trademark applications on the networked system 102 in an off-line manner, and to perform batch-mode communications between the programmatic client 108 and the networked system 102.

FIG. 1 also illustrates a third party server machine 126 executing a third party application 128, which has programmatic access to the networked system 102 via the programmatic interface provided by the API server 112. For example, the third party application 128 may, utilizing information retrieved from the networked system 102, support one or more features or functions on a website hosted by the third party. The third party website may, for example, provide one or more trademark services that are supported by the relevant applications of the networked system 102. As previously noted, in some embodiments third party server 126 may be a server for a national government agency that registers trademarks and allows for access to a database 130 of registered trademark images.

Figure 2:
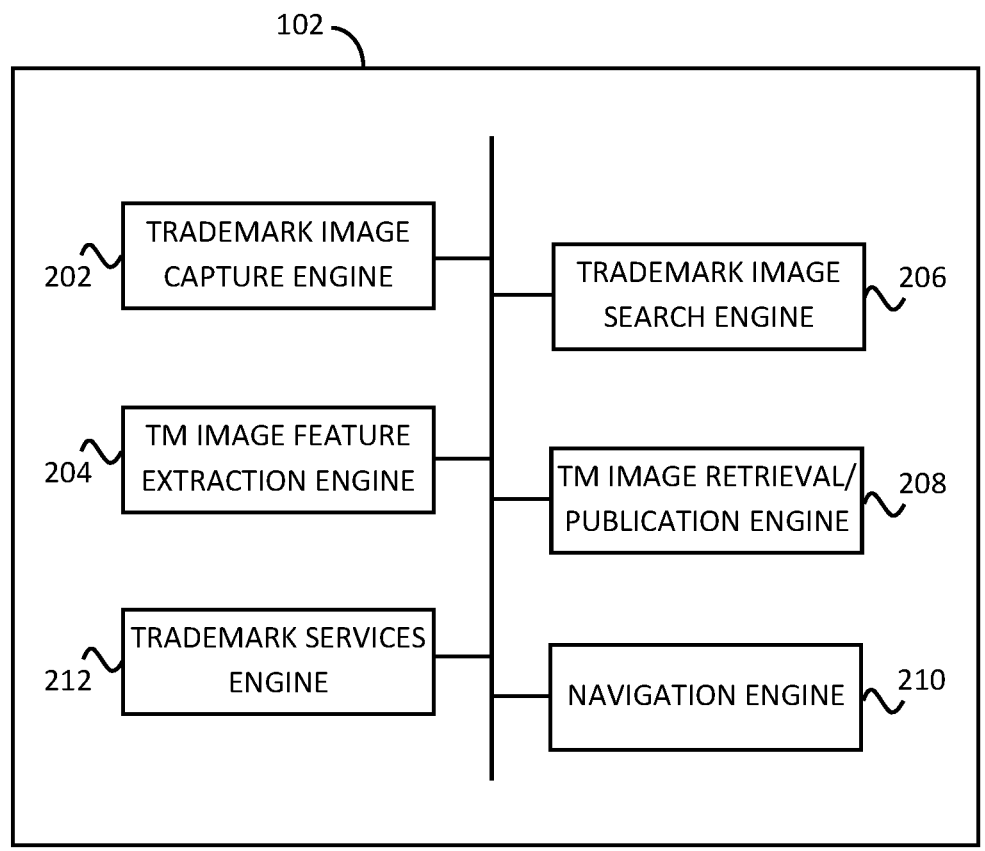
FIG. 2 illustrates a block diagram showing components provided within the system of FIG. 1 according to some embodiments.

Referring now to FIG. 2, a block diagram illustrates components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 124 via the database servers 122. It is also possible that components may access one or more third party databases 130.

The networked system 102 may provide a number of trademark service mechanisms whereby an applicant may provide or capture a query image (e.g., a potential trademark), and the system 102 may then compare the received query image to a database or set of images (e.g., registered trademarks), provide best "matches", display returned or retrieved images to allow viewing of the retrieved images, and apply for a trademark registration. To this end, the networked system 102 may comprise at least one trademark image capture engine 202, at least one trademark image feature extraction engine 204, at least one trademark image search engine 206, at least one trademark image retrieval/publication engine 208, at least one navigation engine 210, and at least one trademark services engine 212.

The trademark image capture engine 202 allows for receiving a query image from a user to be used as the basis of a search by search engine 206. The image may be taken from a camera or imaging component of a client device (e.g., a laptop, a mobile phone, or tablet) or may be accessed from storage. In one example, capture engine 202 digitizes or processes the query image.

The trademark image feature extraction engine 204 enables extraction of image features, such as color features extracted as a color histogram, and shape features extracted as an oriented gradients histogram. The image features of color and shape can then be used to search for registered trademarks similar to the query image.

The trademark image search engine 206 enables image queries or keyword queries of registered trademarks. In example embodiments, the search engine 206 receives a query image and/or the keyword queries from a device of a user and conducts a comparison between the extracted image features (e.g., color and shape) and the features of the images in the set of registered trademarks and/or its information related to word descriptions. The search engine 206 may record the query (e.g., images and/or keywords) and any subsequent user actions and behaviors (e.g., navigations). The search engine 206 may also perform a search based on whether the image includes only words, only colors, or both words and colors, and/or whether the image is in black and white or in color.

The search engine 206 also may perform a search based on the country of origin of the registered trademarks, database, or agency to be searched. In addition, a user may access the search engine 206 via a mobile device and generate a search query. Using the search query, the search engine 206 compares relevant image features to find the best matches, in one example based upon the shortest mathematical distance, such as Bhattacharyya distance.

The trademark image retrieval/publication engine 208 may provide, publish, and/or return relevant search results for similar or matched registered trademarks based upon the compared color and/or shape features. In one example, image retrieval/publication engine 208 returns results in numerical order of shortest Bhattacharyya distance. Image retrieval/publication engine 208 may also include a category or classification for each returned registered trademark (e.g., Nice classification in which the registered trademark is classified under a good or service associated within a particular category). Additional information associated with the registered trademarks, such as owner, registrant, description, registration date, and the like, are within the scope of the embodiment.

Networked system 102 may further include a navigation engine 210, which allows users to navigate through various categories or classifications of the retrieved (returned) registered trademarks. For example, the navigation engine 210 allows a user to successively navigate down a category tree comprising a hierarchy of categories (e.g., the category tree structure) until a particular set of listings is reached. Various other navigation applications within the navigation engine 210 may be provided to supplement the searching and browsing applications. The navigation engine 210 may record the various user actions (e.g., clicks) performed by the user in order to navigate down the category tree.

Additional modules and engines associated with the networked system 102 are described below in further detail. It should be appreciated that modules or engines may embody various aspects of the details described below.

Figure 3:
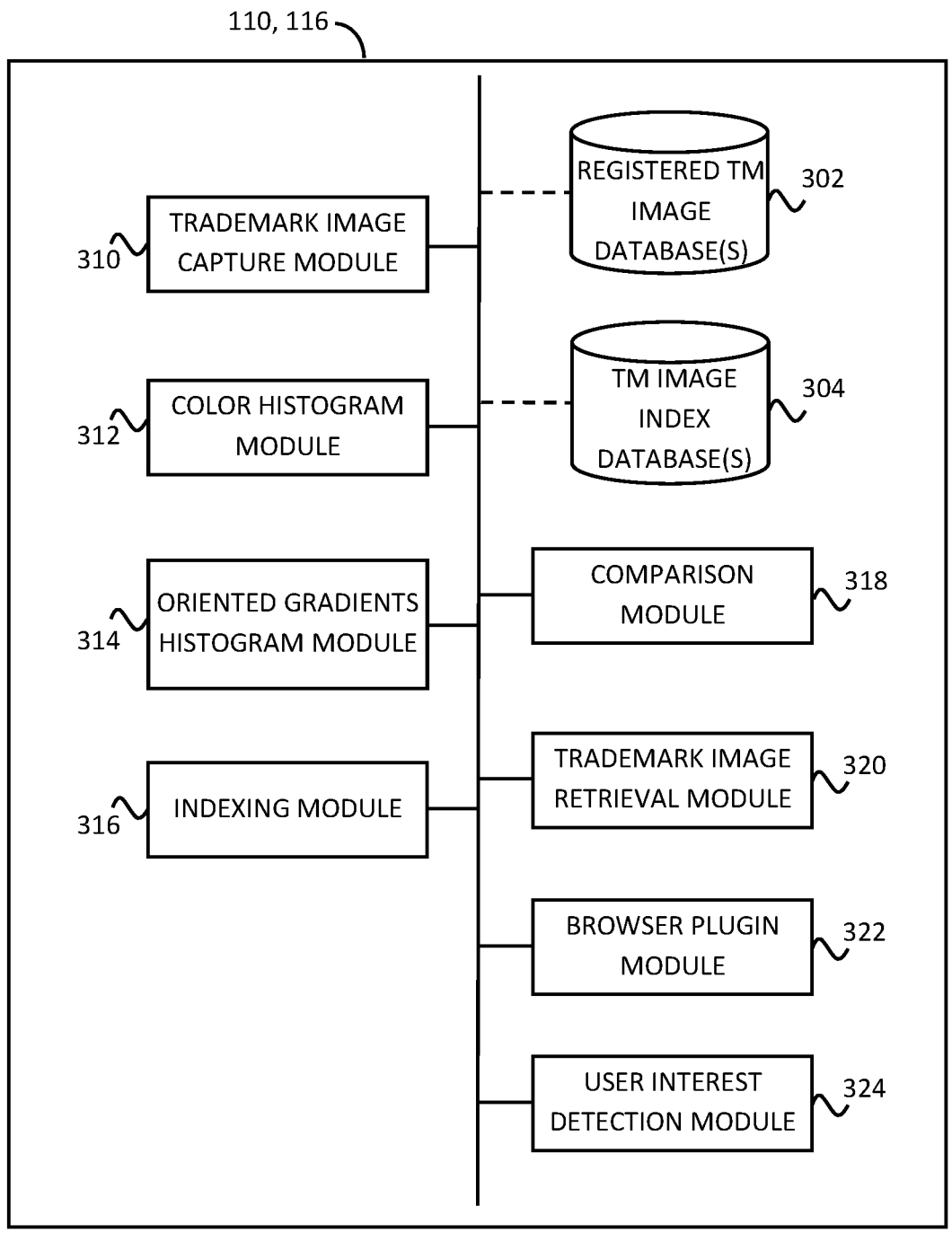
FIG. 3 illustrates a block diagram showing image processing and image data usage functionalities/operations implemented in modules and libraries/data structures/databases according to some embodiments.

FIG. 3 illustrates a block diagram showing image processing and image data usage functionalities/operations implemented in modules and libraries/data structures/databases according to some embodiments. The modules comprise one or more software components, programs, applications, or other units of code base or instructions configured to be executed by one or more processors included in the application servers 116, and/or device machine 110. The modules include a trademark image capture module 310, a color histogram module 312, an oriented gradients histogram module 314, an indexing module 316, a comparison module 318, a trademark image retrieval module 320, a browser plugin module 322, and a user interest detection module 324. The modules 310-324 can communicate with each of a registered trademark image database 302 and trademark image index database 304, in which databases 302, 304 may or may not be included in the databases 124. It is also noted that database 302 may be associated or linked to third-party database 130. Although modules 310-324 are shown as distinct modules in FIG. 3, it should be understood that modules 310-324 may be implemented as fewer or more modules than illustrated. It should also be understood that any of modules 310-324 may communicate with one or more components included in the system 100, such as database servers 122, application servers 116, third party server 126, or device machine 110. Similarly, databases 302, 304 are shown as distinct databases in FIG. 3. However, it is understood that the content of databases 302, 304 may be stored in fewer or more databases than illustrated.

In some embodiments, one or more of modules 310-324 are downloaded from a service site appropriate for the type of computing device, or multiple modules or applications that are OS dependent may be available for download. For example, if the device machine 110 comprises an iOS-type device (e.g., Mac, iPhone, or iPad), then the modules (which can be packaged as part of a trademark services and/or search application) can be downloaded from iTunes. Similarly, if the device machine 110 comprises an Android-type device, then the modules can be downloaded from the Android Marketplace. The device machine 110 has communication capabilities with servers or databases at a remote location (e.g., databases 124, database servers 122, API server 112, web server 114) to access data and/or processing capabilities to facilitate image capture, image processing, and use of image data from image processing as described in further detail below.

In other embodiments, one or more of modules 310-324 may be hosted on the application servers 116 and no download of the modules is required on the device machines 110. Instead, the modules may be accessed by device machines 110 using a web browser over the network 104. In still other embodiments, some of the modules may be included in the device machines 110 while other of the modules may be included in the application servers 116; the device machines 110 communicating with the application servers 116 to together provide the appropriate functionalities.

Figure 4:
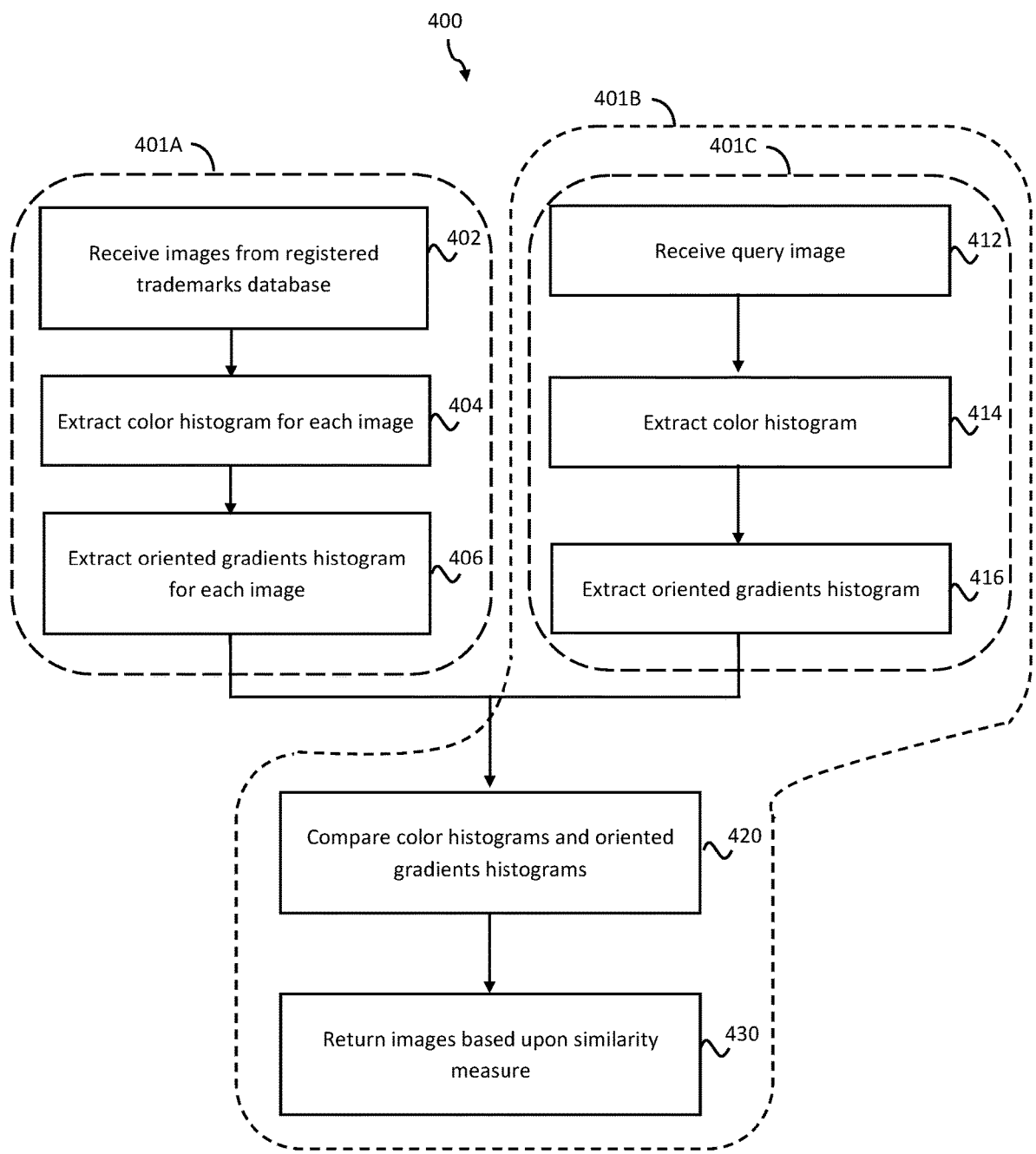
FIG. 4 illustrates an example flow diagram for trademark image processing and determination of trademark image matches or comparison implemented by the modules of FIG. 3 according to some embodiments.

FIG. 4 illustrates an example flow diagram 400 for image processing and determination of image matches implemented by the modules of FIG. 3 according to some embodiments. The operations of the flow diagram 400 may be performed by the device machine 110, and/or a server included in the networked system 102 (e.g., API server 112, web server 114, application servers 116, database servers 122).

Operations/functionalities of flow diagram 400 can be classified into two phases: an indexing phase 401A and a matching phase 401B. In some embodiments, the indexing phase 401A comprises offline image processing of pre-existing registered trademark images (e.g., images corresponding to registered trademarks stored in database 124, 130, and/or 302) by, for example, application servers 116 in order to obtain image feature data. The pre-existing registered trademarks may be provided from various sources, such as different government agencies, a privately compiled database of registered trademarks, or the like.

The obtained image feature data can be indexed into the image index database 304 and subsequently used for faster look-up during the matching phase. In some embodiments, the registered trademark images can be processed in one or more batches. In some embodiments, a part or a batch of the registered trademark images can be processed online and the obtained image feature data can be indexed into the image index database 304. Images may be indexed based on their features/attributes such as, but not limited to, color distribution shown through a color histogram, orientation histogram, and the like, and also based on other available information associated with the registered trademark, such as but not limited to, Nice classification, registrant, owner, country, and the like.

Once the indexing phase 401A is complete, the matching phase 401B can be triggered by receipt of a query comprising an image (referred to as a query image or an input image). The image index database 304 is accessed to find the closest matching registered trademark image(s). These registered trademark image(s) are presented as "matching" results to the query image based upon a similarity measure. Blocks 402-406 relate to the indexing phase 401A, and blocks 412-430 relate to the matching phase 401B. Blocks 412-416 relate to a feature extraction phase 401C within matching phase 401B, in which color and shape features from the query image are extracted. Blocks 412-416 correlate to blocks 402-406 of indexing phase 401A and are substantially similar to the extraction of color histograms and oriented gradients from registered trademarks as in the indexing phase 401A. In other embodiments, the order of the extraction of the color histogram and the oriented gradients histogram may be reversed or processed simultaneously (in other words, the order of blocks 404/414 and 406/416 may be switched or processed substantially simultaneously). The indexing phase 401A operations are first described below followed by the matching phase 401B operations. In yet other embodiments, a single feature extraction algorithm (in other words, matching based upon only a color feature or a shape feature) may be used and chosen by the user, in particular if the trademark input/query image is based only on color (i.e., involves no shape) or only on shape (i.e., involves no color or is black and white).

For the indexing phase 401A, at a block 402, the networked system 102 (e.g., application servers 116) retrieves a registered trademark image from a database, such as the registered trademark image database 302, which may refer to database 124, a third party database 130, or another database not necessarily housed within device machine 110 or application server 116 but accessible to device machine 110 or application server 116. Database 302 includes registered trademark images and information associated with the registered trademarks. Information about a registered trademark includes, but is not limited to, registrant, country, Nice classification, associated dates, description, and the like. The registered trademark image may include various words, letters, colors, lines, shapes, patterns, and/or the like. Although operations taken on a single trademark image is discussed herein, it is understood that a plurality of images can be processed simultaneously with each other in batch jobs. Operations taken on a given single trademark image is for ease of discussion only.

At a block 404, a color histogram is extracted or the color distribution of the image is identified by color histogram module 312. The indexing module 316 is configured to appropriately index and add the color histogram image feature data corresponding to the trademark image to the image index database 304. The image can be indexed based on one or more attributes. For example, the image can be indexed according to its extracted color features, extracted shape features, associated information, and the like, to facilitate rapid look-up of matching items.

The background of the trademark image (e.g., a solid white and/or black background) may be automatically removed. In some embodiments, a sampling mask may provide the spatial sampling area of the inventory image for subsequent feature extraction operations. In other embodiments, a sampling mask is not used or needed as the entire trademark image can be processed. Once the sampling area of the image has been determined—the area within the sampling mask—such sampling area is used for various image feature extraction and identification. In other embodiments, no sampling area is determined as the entire image is processed. Extraction of the color histogram comprises the extraction or identification of the color distribution of the item featured in the image.

The choice of color representation is relevant for extraction of color distribution. Color can be represented in various ways. A color space suited for trademark images is the red, green, and blue (RGB) color space, where all colors are represented with respect to three color channels red, green, and blue in 3-dimensions. In one embodiment, the trademark image (more particularly, within the sampling mask area or the entire image) is sampled or scanned uniformly (also referred to as uniform sampling) using RGB color space. The pixels from the image are sampled. Once these pixels are sampled, information (e.g., image features or attributes) is extracted from each of these pixels. The information can be extracted based on the pixel or the pixel along with its immediate neighbors. Information about color is extracted on a pixel by pixel basis, and then combined, consolidated, or pooled into a collection of values (also referred to as features). In the case of color features, histogram techniques are used—to obtain, for example, a color histogram. A histogram comprises a consolidation of occurrences of various values an item, such as a pixel, can take.

Figure 5:
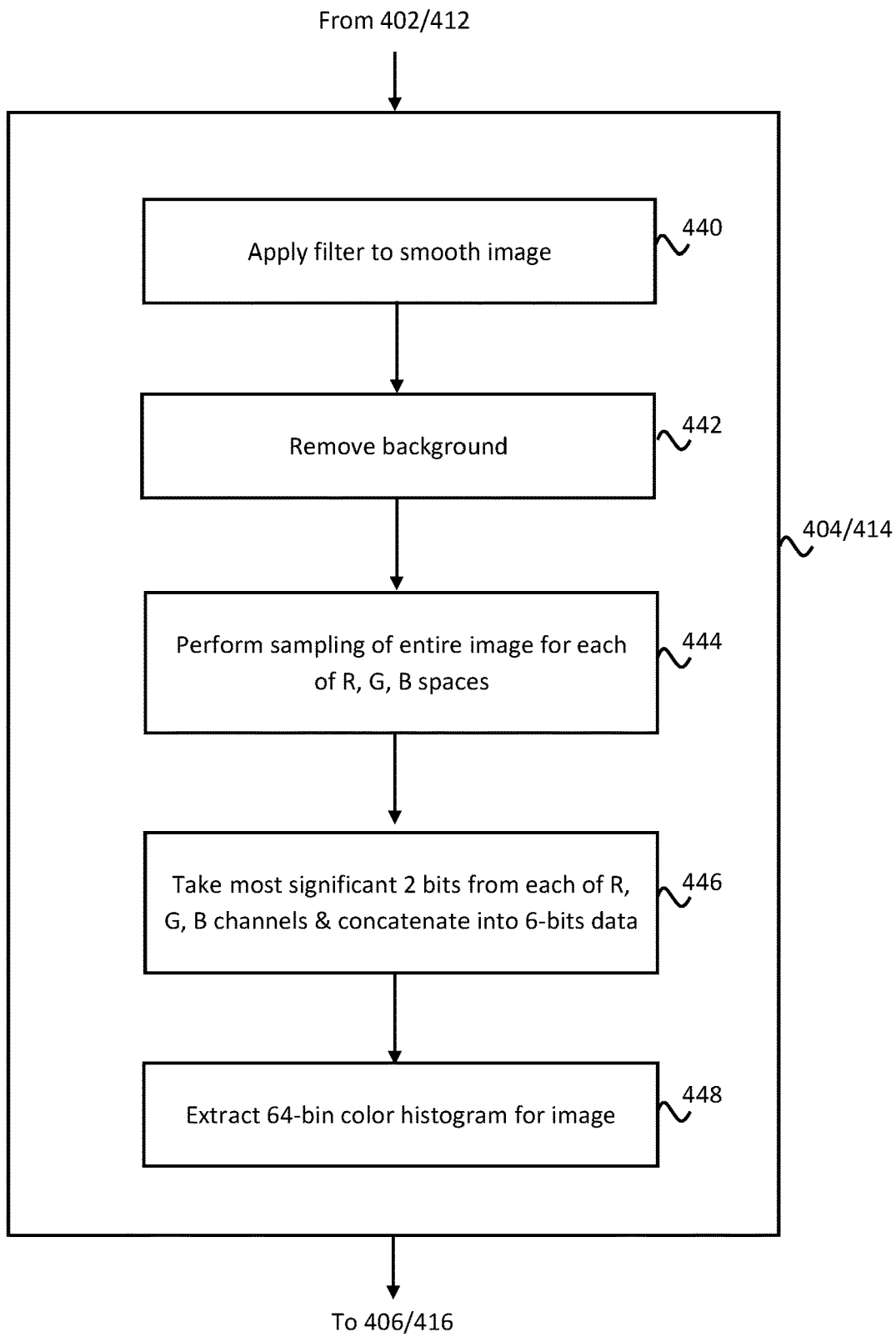
FIG. 5 illustrates processing of an image to generate a color histogram according to some embodiments.

FIG. 5 illustrates details of blocks 404 and 414, processed after blocks 402 and 412, respectively, and before blocks 406 and 416, respectively, according to some embodiments. As noted above, in other embodiments, the processing order for color histograms and oriented gradients histograms may be switched or substantially simultaneous.

In one embodiment, at block 440, a median filter algorithm is applied to smooth the trademark image before extracting a color histogram. At block 442, the background (e.g., a solid white and/or black background) is removed. At block 444, the entire image (all pixels after background removal) is sampled for each of the RGB color channels. At block 446, the most significant two bits are concatenated from each of the RGB channels to provide or produce 6-bits data for all the pixels of a given image, and then the 6-bits data are used to populate the histogram. At block 448, the 6-bits data are used to extract a 64-bin color histogram for the trademark image.

It is noted that in some embodiments, once the bins are accumulated, weights are not applied, while in other embodiments, weights to the bins may be applied. The non-weighted or weighted adjusted samples are stacked or combined together to generate a resulting stacked histogram corresponding to the three dimensions/channels of the RGB color space. It is noted that RGB values may be normalized to range from 0 to 1 in some embodiments. It is further noted that the range of valid values for the RGB channels are the same as one another in some embodiments.

Previous methods and systems have used other color spaces, such as HSV, or the full RGB color map, and Euclidean distance space for comparison. However, using original highly segmented RGB values gives higher variation and less accurate results for trademark images, which do not often include a high variation of dominant colors (e.g., often using only tones, degradations, or variations of the same color). Accordingly the present disclosure provides a reduced or decreased color segmentation by grouping similar colors together, thereby allowing for more accurate color matching in trademark images.

Advantageously, the present disclosure provides for smoothing the trademark image to suppress the noisy pixels or to reduce or eliminate the negative effects of noise in the image, removing the background pixels, and extracting the color histogram for the foreground (e.g., by removing white and/or black background). Furthermore, the present disclosure decreases the scale of colors considered (in other words, similar colors are grouped together) as a 64-bin (2 to power of 6) color histogram. Less detail has been discovered to be more advantageous for color matching of trademark images. In addition, the use of Bhattacharyya distance (which is less sensitive to elliptical color distribution and which allows for an elliptical distribution) instead of Euclidean distance (which is more sensitive to elliptical color distribution/ which allows for spherical clusters) provides more accurate color matching in trademark images.

Returning to FIG. 4, at block 406, an oriented gradients histogram is extracted from the trademark image by oriented gradients histogram module 314. The indexing module 316 is configured to appropriately index and add the oriented gradients histogram feature data corresponding to the trademark image to the image index database 304. The image can be indexed based on one or more attributes. For example, the image can be indexed according to its extracted color features (e.g., a color histogram), extracted shape features (e.g., an oriented gradients histogram), associated information (e.g., Nice classification), and the like, to facilitate rapid look-up of matching items.

Figure 6:
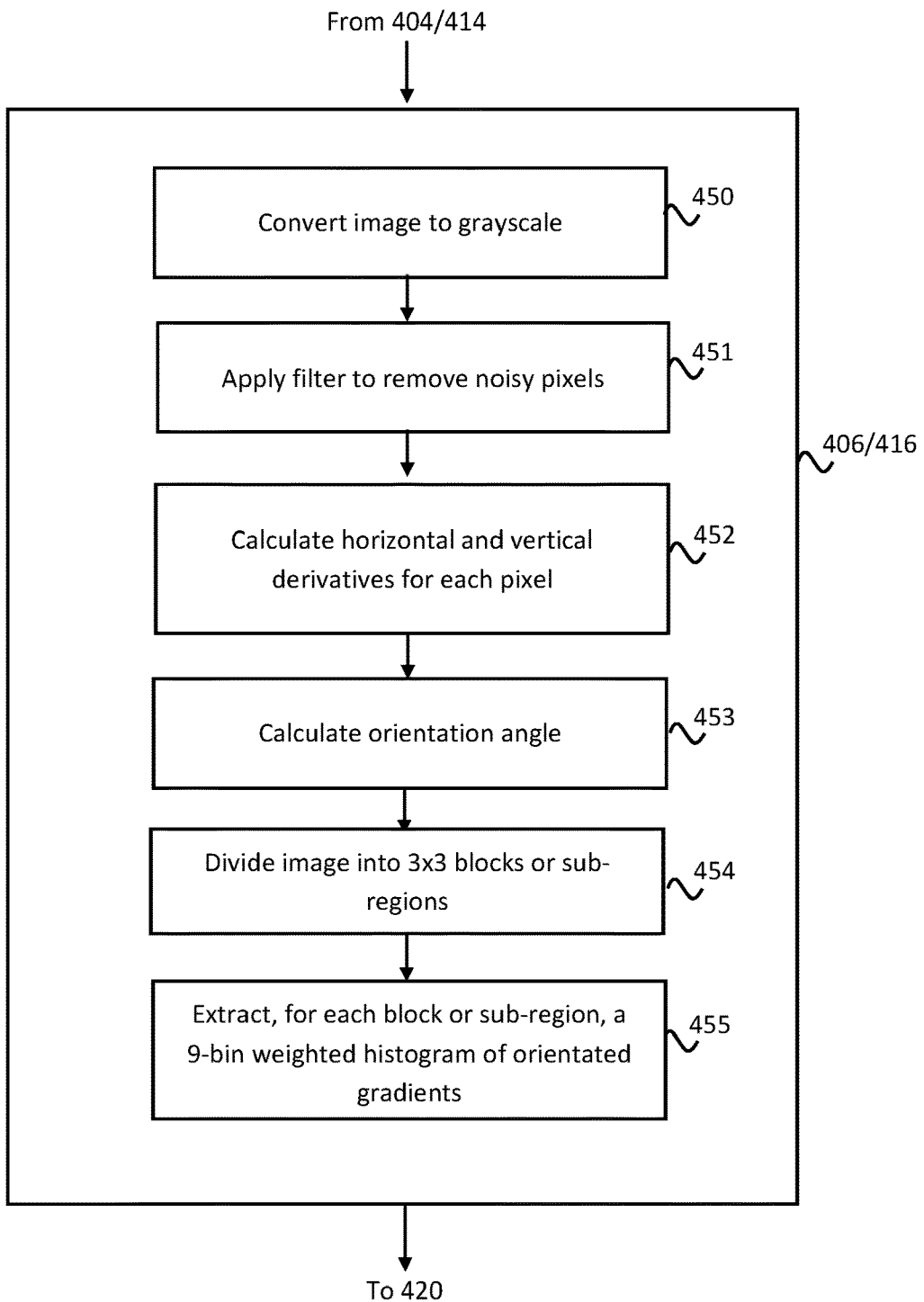
FIG. 6 illustrates processing of an image to generate an oriented gradients histogram according to some embodiments.

FIG. 6 illustrates details of blocks 406 and 416, processed after blocks 404 and 414, respectively, and before block 420, according to some embodiments. As noted above, in other embodiments, the processing order for color histograms and oriented gradients histograms may be switched or substantially simultaneous. In yet other embodiments, single feature processing using only color features or only shape features may be used. In one embodiment, at block 450, the image is converted to grayscale from color (if in color). Converting to grayscale format, which represents the linear contribution of the three RGB color channels, reduces unnecessary color channels data, and thus allows for greater efficiency and speed in obtaining a shape feature histogram.

At block 451, a median filter is applied to the image to suppress or remove noisy pixels prior to applying an edge detection or shape algorithm.

At block 452, horizontal and vertical derivatives (also referred to as x- and y-derivatives) are calculated (e.g., by Scharr operator) for each pixel of the image. A horizontal derivative provides a horizontal gradient and a vertical derivative provides a vertical gradient.

In one embodiment, a Sobel filter may be applied to obtain an edge map for all the pixels of the image. The Sobel edge map corresponding to the image comprises a faithful line drawing of the edges included in the image with the colors removed. In other embodiments, it is possible to use other edge detection algorithms, such as a Canny edge detector, to obtain a Canny edge map.

At block 453, an orientation angle (also referred to as an oriented gradient) is calculated by taking the arctangent of the vertical derivative divided by the horizontal derivative, calculated for each pixel at block 452.

At block 454, the image is divided into blocks (which can also be referred to as sub-cells or sub-regions). In one example, the entire image is considered a cell, and the cell is divided into 3×3 blocks (or sub-cells or sub-regions). In another example, the image may be divided into 2×2 cells, and 3×3 blocks within each cell (e.g., 6×6 or 36 blocks or sub-cells or sub-regions). Orientation calculations are performed for each pixel in each block. Then each pixel grouped in blocks contributes to the orientation histogram. Thus, for an example of one cell, 3×3 blocks, and a 9-bin histogram per block, an 81-bin oriented gradients histogram is provided as a shape feature.

Alternatively, magnitude calculations may also be performed for each pixel in each block and used as a weighting factor for the orientation histogram. A gradient magnitude may be calculated by taking the square root of the sum of the squares of the horizontal and vertical gradients. The gradient magnitude may then be used as part of a weighting factor for the weighted orientation histogram.

At block 455, a 9-bin weighted oriented gradients histogram is extracted for each block by populating the histogram with the calculated orientation angles with weighted values. In one example, the oriented gradients histogram is divided to the following 9 bins with weighted values for higher accuracy: 0-20, 20-40, 40-60, 60-80, 80-100, 100-120, 120-140, 140-160, and 160-180. The weight given to an orientation angle may be a ratio or percentage to accurately populate the angle into the bins. The weight is used such that an angle may contribute to neighboring bins which are included in the histogram. For example, if the calculated angle is 50, the angle may contribute equally to bins 40 and 60. For example, if the calculated angle is 45, a ¾ weight may be given to bin 40 and a ¼ weight may be given to bin 60. At block 455, the orientation histogram module 314 applies a weight to each orientation angle of a pixel of the edge map, which results in a weighted orientation histogram that accurately fits the orientation angles into 9 bins. Then, the orientation histogram module 314 sums the bins in the weighted orientation histogram to obtain a shape feature of the trademark image.

Alternatively, as previously mentioned, a gradient magnitude may be calculated by taking the square root of the sum of the squares of the horizontal and vertical gradients. The gradient magnitude may then be used as part of a weighting factor for the weighted orientation histogram.

Advantageously, as described above, a courser or less fine segmentation (i.e., less blocks or sub-regions) than previously used to obtain shape features may be used for trademark images as the trademark is typically centered and the entire image is processed. Furthermore, the combination of the image shape feature processing and the color feature processing with the decreased color space allow for efficient and accurate trademark image processing and matching.

Thus, image features of a given inventory image are extracted/identified and such image features are stored in the image index database 304 appropriately indexed to facilitate rapid look-up in response to query images. By repeating blocks 402-406 as many times as needed, all of the registered trademark images (sets, batches) as desired can be similarly indexed.

With the inventory images indexed, FIG. 4 will now be described in the context of the matching phase 401B. At block 412, the image capture module 310 is configured to receive a query image. In one embodiment, the query image is sent by a device machine 110 to the networked system 102. A user of the device machine 110 (e.g., a smartphone) may take a photograph of a color, shape, pattern, logo, textile, or the like to capture an image of interest using the camera included in the device machine 110. The photograph is transmitted to the networked system 102, to be the query image, for image feature extraction and to return registered trademark images most similar to the query image. In other embodiments, a user may provide a query image file to device machine 110, which then transmits the image file to networked system 102 and image capture module 310.

Device machine 110 may interface with the networked system 102 via a website using a web browser. A query image may be sent to the networked system 102 to extract features from the query image. The networked system 102 uses the query image's extracted features to find matches with registered trademark images. The top matches are returned to the device machine 110 formatted in a match results web page.

Device machine 110 may either install an application to interface with networked system 102 or access a website hosted by the networked system 102. When a user launches the application at the device machine 110, the application facilitates the user to input or otherwise specify a query image. As an example, the application may include camera capabilities (or otherwise access a separate camera app) to permit the user to take a photo or otherwise obtain an image of interest (e.g., shape or word that is colored and/or patterned). Furthermore, the application may upload or link to a digital file of the query image already on device machine 110.

For blocks 412-416, the same operations as described above for blocks 402-406 are performed except the operations are taken on the query image instead of a registered trademark image.

For block 420, the comparison module 318 is configured to compare the color histogram and oriented gradients histogram of the query image to the color histograms and oriented gradients histograms of the registered trademark images to find one or more registered trademark images similar to or matching the query image.

Figure 7:
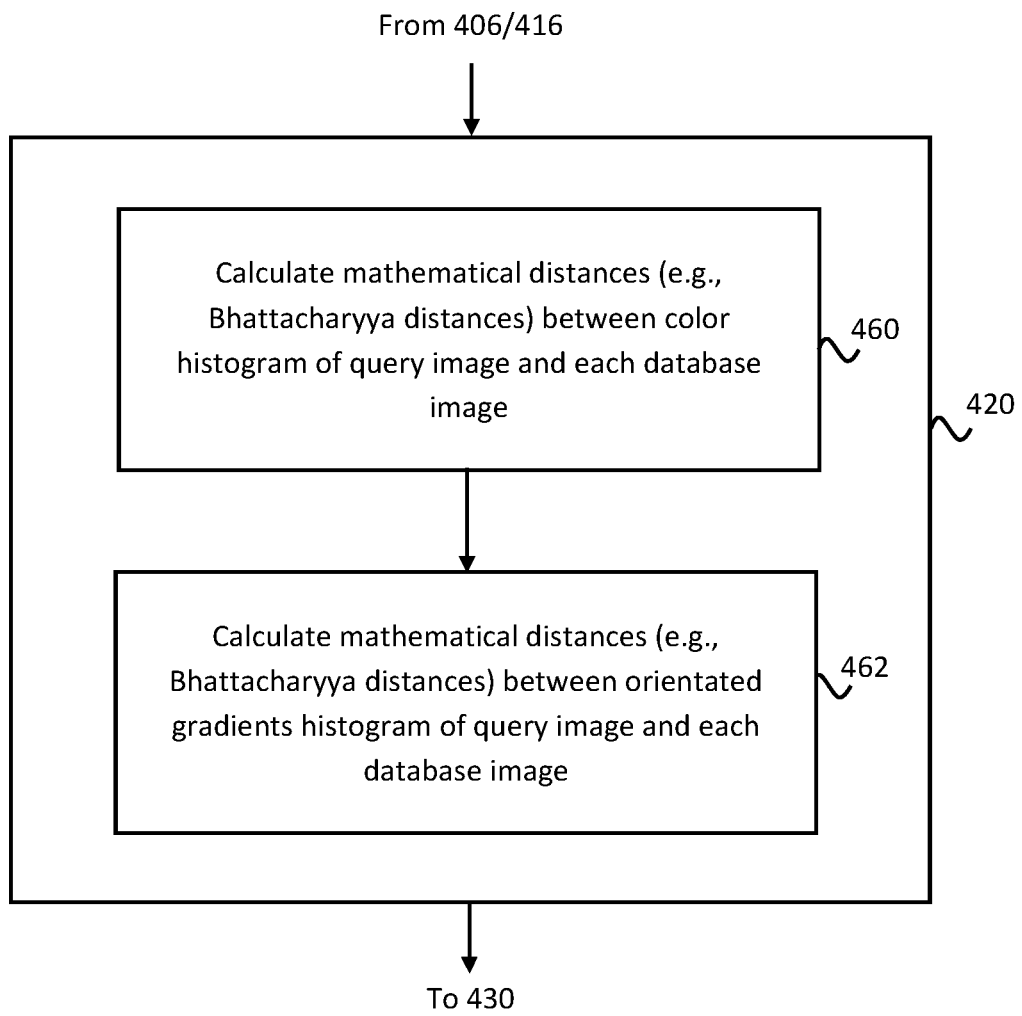
FIG. 7 illustrates a high-level flow diagram of the matching or comparison phase according to some embodiments.

FIG. 7 illustrates further details of block 420, processed after blocks 406 and 416, and before block 430, according to some embodiments. Comparison module 318 performs two comparisons for each pair of a query image and an indexed trademark image: a comparison of the color histograms and also a comparison of the oriented gradients histograms. At block 460, mathematical distances between a color histogram of the query image and a color histogram of each registered trademark image is calculated. At block 462, mathematical distances between an oriented gradients histogram of the query image and an oriented gradients histogram of each registered trademark image is calculated. As noted above, in other embodiments, the processing order for comparing color histograms and oriented gradients histograms may be switched or substantially simultaneous. In yet other embodiments, only a single feature comparison is made (i.e., either color features or shape features are compared and not both).

In both algorithms explained above (i.e., color and shape based algorithms), a similarity measure for color and shape features between a given query/input image and all the database images listed in a folder is calculated and sorted, for example according to Bhattacharyya distance. The best matched image has the smallest distance similarity measure. Advantageously, the present method provides for fast and accurate trademark image comparison and retrieval as image texture is not considered. Image texture is not considered as most trademark images do not have texture or many color transitions. Accordingly, less data processing is needed for trademark images, and thus more efficient but still accurate image comparison and retrieval are made possible by the present invention that utilizes less than full RGB color space for extracting the color feature, and courser segmentation (e.g., blocking) for extracting the shape feature. Surprisingly, in extracting both the color features and the shape features, courser and reduced binning is utilized to increase both processing efficiency and accuracy of image comparison for large sets of trademark-type images (on the order of thousands to millions).

A similarity score or value can be assigned for each comparison of the (color or orientation) histograms. For each image pair, the final similarity score is the sum of the color histogram comparison similarity score and the orientation histogram comparison similarity score.

Possible similarity schemes include, but are not limited to, Bhattacharyya distance, cosine similarity (inner product) correlation, Chi-squared correlation, and intersection. In one embodiment, the similarity value or score is calculated to be the Bhattacharyya distance. The Bhattacharyya distance comprises the square root of the complement of cosine similarity of the square root of the color histograms or oriented gradients histograms, as a function of the number of bins.

Returning to FIG. 4, at block 430, the image retrieval module 320 provides the similar or matching results to the device machine 110 for display on the screen of the device machine 110. The matching results (e.g., registered trademark images and possibly associated item information) are displayed in order of degree of similarity to the query image. In other words, a similarity value is assigned for each pair of the query image and an indexed trademark image. The similarity scores are sorted so that matching results can be displayed on the device machine 110 in the order of similarity to the input query image in some embodiments.

In some embodiments, the system or the user may set an upper limit on the number of matching results that may be presented in response to the query image. Further, in some embodiments, a threshold value for the similarity measure may be set such that images not meeting the threshold value are not retrieved or displayed.

Figure 8A:
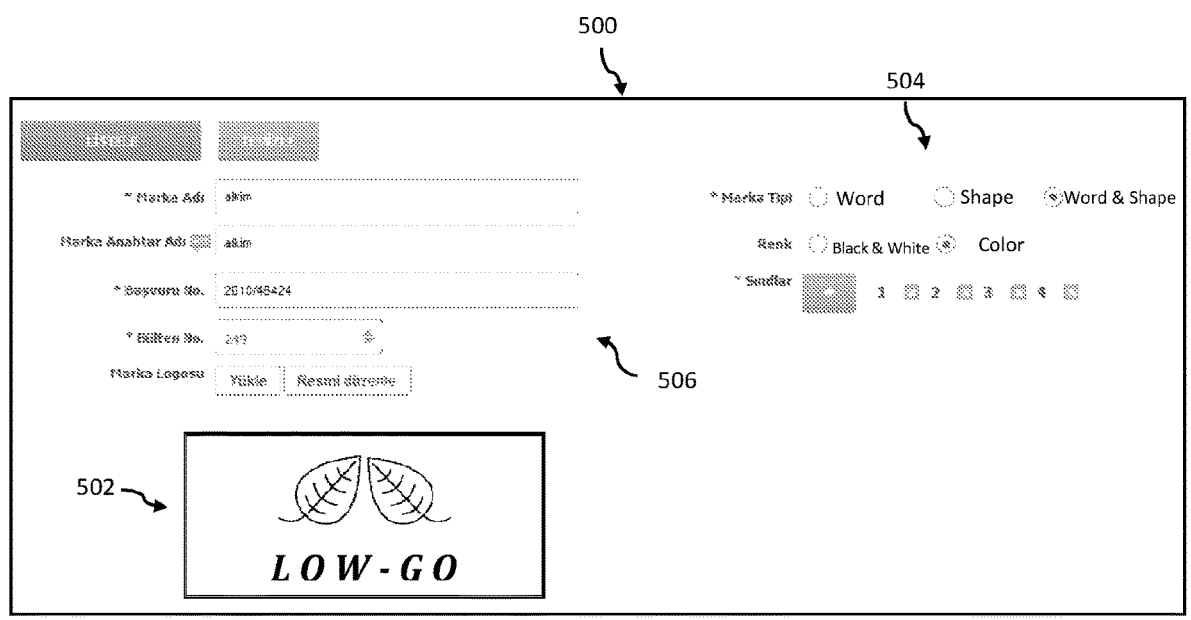
FIGS. 8A-8E illustrate user interface (UI) screens and histogram depictions relating to implementation of the trademark searching flow diagrams of FIGS. 4-7 according to some embodiments.
Figure 8B:
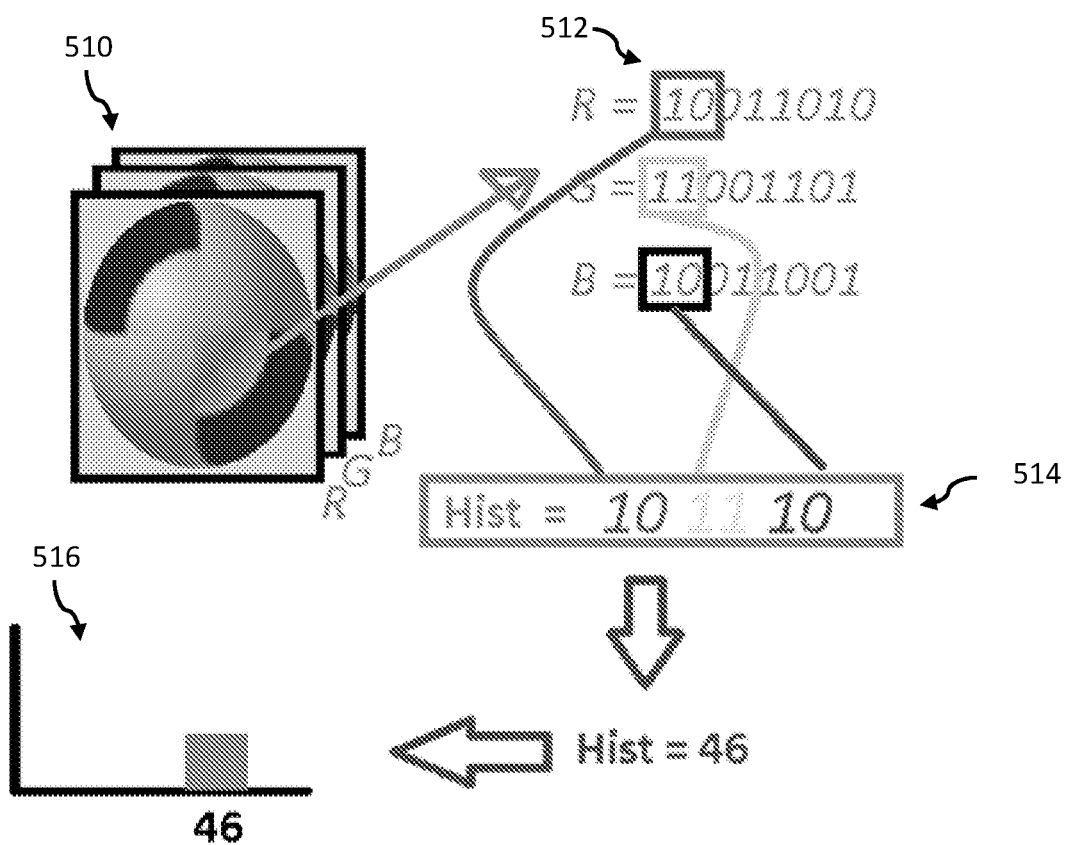
Figure 8C:
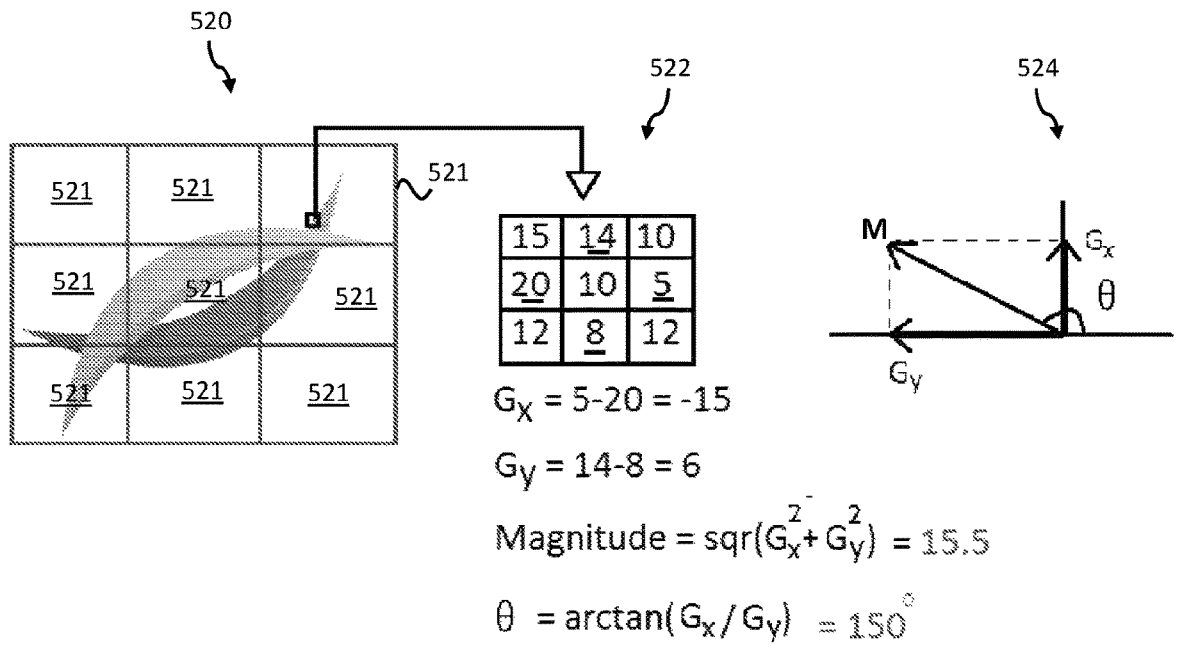
Figure 8D:
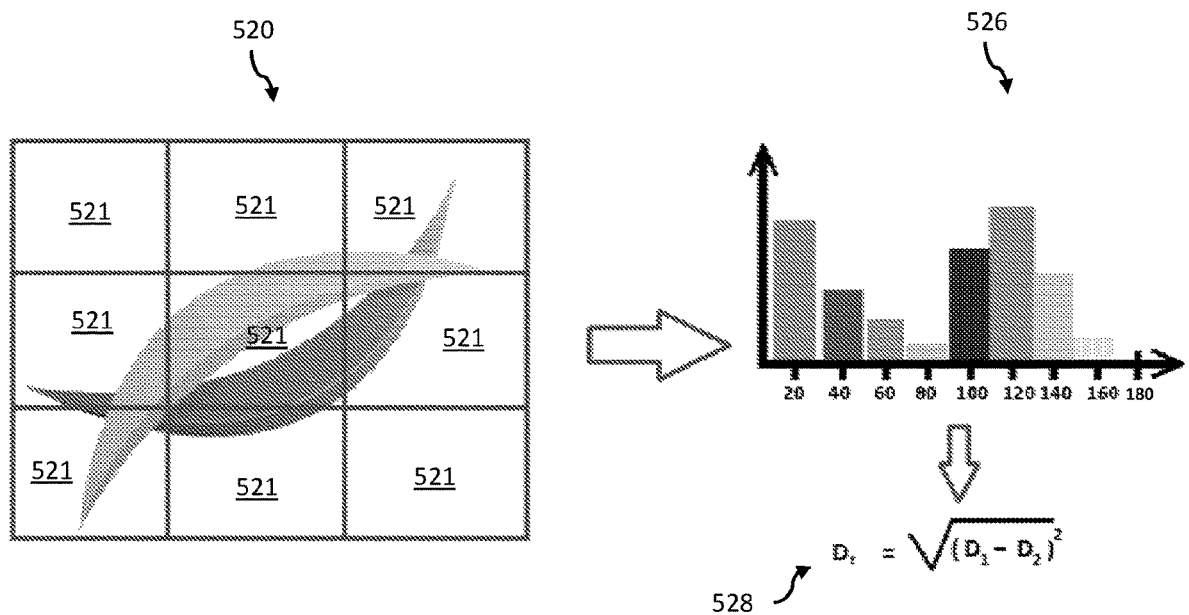
Figure 8E:
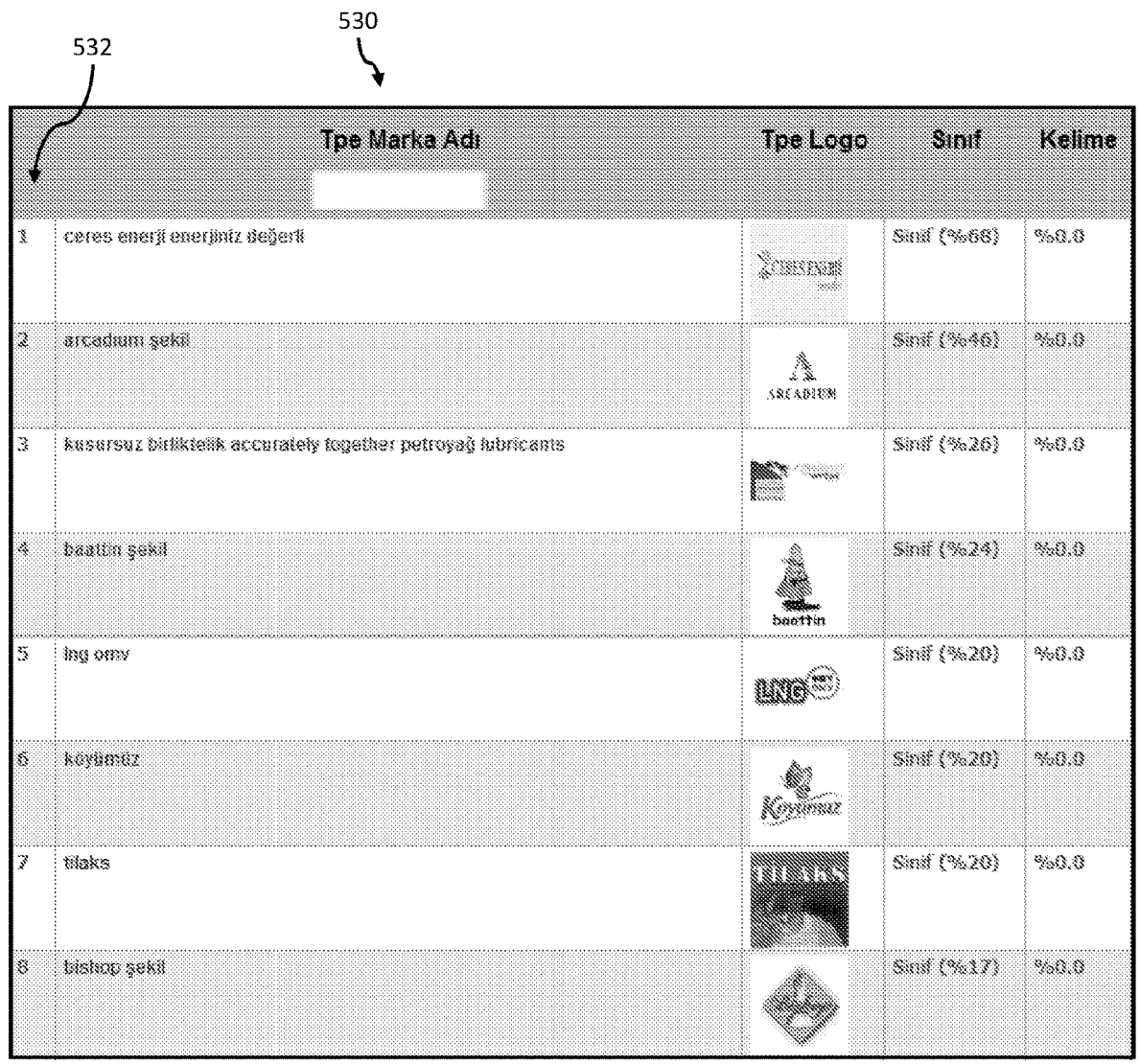

Referring now to FIGS. 8A-8E, FIG. 8A illustrates an example screen shot or user interface screen 500 including a query image 502, FIG. 8B illustrates high-level block diagrams of a color histogram extraction, FIGS. 8C-8D illustrate high-level block diagrams of an oriented gradients histogram extraction, and FIG. 8E illustrates an example screen shot or user interface screen 530 showing retrieved or returned search results after comparison to a query image. FIGS. 8A and 8E illustrate various user interface (UI) screens displayed on the device machine 110 pertaining to the matching phase according to some embodiments.

In user interface 500 of FIG. 8A, the example query image 502 shown on the screen comprises letters, colors, and shapes. The application on device machine 110 (application to interface with networked system 102 or access a website hosted by the networked system 102) transmits the query image 502 to the networked system 102, and in response, the networked system 102 performs image feature extraction operations and provides matching results as discussed above. User interface 500 further includes, in an embodiment, search options 504 for describing the query image, including but not limited to the following: image type (Marka Tipi) such as a word or letter, a shape, or both; color type (Renk) such as black and white or color; and class (siniflar) or description such as a Nice classification or other numbered description. Accordingly, in some embodiments, a user may select matching criteria for the search and retrieval (e.g., to only use a color or shape algorithm and not include both). In an embodiment, user interface 500 further includes data input menu 506, such as but not limited to trademark image name (Marka Adi), keyword (Anahtar Adi), an application number (Basvuru No.), a file number (Bulten No.), and an option for loading (Yukle) or editing (Resmi duzenle) a query image.

FIG. 8B illustrates an example implementation of blocks 404 or 414 for extraction of an image color feature, as illustrated by a portion of a color histogram 516 corresponding to a trademark image with color. The two most significant bits 512 (e.g., 10, 11, and 10) of each RGB channel 510 are taken and combined (e.g., concatenated) to create a new 6-bit value 514 for each pixel in a given image.

The histogram 516 of all 6-bit values of each pixel is then calculated or extracted and combined in a 64-bin color histogram. The horizontal axis represents the bins (a total of 64 bins) for R, G, and B channels 510 for each image pixel. The bins correspond to different colors in the RGB color space. The vertical axis represents the amount of the bins represented on the horizontal axis. Thus, high peaks represent colors that are more prominently present than other colors for the multi-colored trademark image.

A stacked 1D histogram presents information about the image in a relatively compact form, instead of storing values of all pixels of the sampled portion of the image. The vertical axis represents the number of pixels that take the corresponding value on the horizontal axis. Hence, the resulting stacked 1D histogram identifies the colors present within the entire trademark image (or within the sampling mask of the image).

In alternative embodiments, the trademark image can be uniformly sampled using a color space other than RGB color space, such as an HSV color space, although not advantageous. In still other embodiments, the inventory image can be non-uniformly sampled using LUV color space or other color space appropriate for non-uniform sampling, although not advantageous.

FIGS. 8C and 8D illustrate an example implementation of blocks 406 or 416 for extraction of image shape features. A trademark image 520 may include letters, shapes, and colors. Image 520 is divided into blocks 521, such as in a 3×3 configuration resulting in nine blocks 521 (also called sub-cells or sub-regions). Then a 9-bin oriented gradients histogram 526 may be extracted for each of the nine blocks 521, as described above with respect to FIGS. 1-3 (system and apparatus for shape histogram extraction) and FIGS. 4 and 6 (methods of shape histogram extraction). Each block 521 has a D vector length. The distance $D_t$ between each histogram may be measured by using a distance measurement algorithm, as shown at 528.

The shape histogram method provides one cell with 3×3 blocks 521 for an image. Each block 521 provides 9 bins for a total of 81 bins for each image. Most of the trademark images are localized to the center of the image so calculating upper-left, upper-right, bottom-left and bottom-right sides is time consuming and may not contribute to the histogram as well. In comparison to an image which is divided into 2×2 cells, each cell having 3×3 blocks and each block having 9 bins, which means 2×2×3×3×9 or 324 bins or features. Calculating the similarity between each vector which has 324 elements takes much more time than a vector which has 81 elements.

For each pixel of the image 520, a matrix 522 representing shape elements is calculated, and then vertical derivatives Gx and horizontal derivatives Gy are calculated. The vertical derivative Gx divided by the horizontal derivative Gy results in a derivative quotient. An orientation angle θ is then calculated by taking the arctangent of the derivative quotient (vertical derivative divided by the horizontal derivative). A gradient magnitude may be calculated by taking the square root of the sum of the squares of the vertical derivative and the horizontal derivative (square root of $(Gx^2+Gy^2)$). Graph 524 illustrates the vertical derivative Gx, the horizontal derivative Gy, the magnitude M, and orientation angle θ, in one example.

In one example, oriented gradients histogram 526 is populated by weighted orientation angles θ using 9 bins: 0-20 degrees, 20-40 degrees, 40-60 degrees, 60-80 degrees, 80-100 degrees, 100-120 degrees, 120-140 degrees, 140-160 degrees, and 160-180 degrees. In another example, oriented gradients histogram 526 may be populated by weighted orientation angles θ including a magnitude component.

In FIG. 8E, screen 530 shows returned or matching results displayed on the device machine 110. All items that are deemed to "match" the query image are displayed. The matching results may be organized and displayed in various ways, such as based upon similarity value (e.g., by smallest Bhattacharyya distance), such as total similarity value, color histogram similarity value, or oriented gradients histogram similarity value. Screen 530 shows order numbers 532 for the returned images based on Bhattacharyya distance, with the smallest Bhattacharyya distance having the smallest order number and the corresponding retrieved image appearing earlier on the list of retrieved results. The matching results may also be organized and displayed based upon a combination of similarity value and categories, such as based upon Nice classification, registrant, or the like. The matching items within a selected category may be then ordered from highest to lowest similarity score for that category. For each matching image, information such as, but not limited to, a color image and one or more of a similarity score, registrant, owner, and country may be displayed.

The user can select from among the displayed matching images, for example, a third ranked image. In response, additional image details may be provided about the selected image. The user can navigate within the matching results to view one or more registered trademarks of interest. Thus, in one embodiment, a user can simply provide a query image, either by pointing to an image file or taking a photo of something having a color and/or pattern, and the application in conjunction with the networked system 102 may automatically return images from a database of registered trademarks that are similar or match the color, pattern, and/or shape.

When the set of registered trademarks includes tens of thousands to millions of registered trademarks, the number of matching results for a given query image can be prohibitively high. Especially when the matching results are viewed on smaller displays, as is common in smartphones and other mobile devices, viewing exhaustion can occur well before all of the matching items are viewed by the user. Even on larger displays, users are more likely to view top matching results than (much) lower matching results. Thus, efficient and accurate results are highly desirable.

In order to provide more user options in viewing retrieved images and possibly improve desired results, user indications during interaction with the provided matching results can be used to re-rank or re-order the registered trademarks within the initial matching results to better suit the user's interest or to improve results.

For example, during user interaction with the matching results corresponding to a given query image at the device machine 110, the user may indicate an interest in a particular registered trademark from among the match results. Image details corresponding to the selected image may be displayed (e.g., a larger image, additional images, registrant, country, and/or the like).

A button or other indicator may give the user an option to request re-ordering based upon one or more correlation, association, or recommendation rules. Several factors, such as the user selection of a particular trademark, trademarks, content of the selected trademark(s) (e.g., particular histogram type to prefer—either color or shape features), or trademark-associated information such as Nice classification, registrant, owner, country, and/or the like, may be used for the correlation or association to other trademark images for the re-ordering/re-ranking process. The user interest detection module 324 at the networked system 102 receives the user indication/preference for the particular image or associated information and may then cause a re-ordering of the initially matched trademark images based upon correlation or association rules, such as the user selected trademark or associated information. A user preference for more than one image within the match results can be indicated prior to initiation of re-ordering or re-ranking. Then re-ordered match results may be displayed on the device machine 110.

The re-ordered matching results comprise refinement of the initial matching results in accordance with additional user input regarding image(s) of interest within the initial matching results.

The re-ordering/re-ranking operation can be repeated more than once for a given matching results in response to new or additional preference for certain image(s) or image-associated information within the matching results provided by the user.

Thus, the present invention provides for the capture of a query image and image features extraction, presentation of registered trademark images that have the closest match to the image features of the query image, and viewing of registered trademark image details with an option to refine the returned results based upon user interest or selected information.

An alternative way to obtain the query image, other than the user providing an image file or taking a photo and uploading it to the networked system 102 via an application or website on the device machine 110, is from websites not associated with the network system 102, such as any website comprising HTML-based web pages. Such an option may be useful to search for registered trademarks by country category.

User interest detection for re-ordering or refining the match results and acquisition of query images from third party websites are facilitated by a browser plugin installed on the device machine 110, as further described hereafter. A browser plugin provided by the networked system 102 (e.g., application servers 116) is installed on the device machine 110. The browser plugin comprises a browser extension, jquery snippet of code, or browser plugin. The browser plugin can be a standalone module or part of an application. The browser plugin includes at least the browser plugin module 322. The browser plugin module 322 is configured to monitor web browser activity at the device machine 110 to detect a request for a certain website (or web page). The request comprises user entry of a uniform resource locator (URL) address in a web browser included in the device machine 110, or the user clicking on a hyperlink to a web page. The certain website comprises a website (or web page) from among a plurality of websites (e.g., any website comprising HTML-based web pages) from which a query image can be sourced. Such a website (or web page) may also be referred to as a query image source or external third party query image source.

The browser plugin module 322 and/or the user interest detection module 324 is configured to detect user interest in or attention on an image included in a web page. In one embodiment, user interest in an image is detected when the user hovers a pointing device (e.g., mouse, trackpad, trackball, finger, etc.) at or near a particular image for at least a minimum time period. In alternative embodiments, the browser plugin module 322 can provide one or more graphical user interface (GUI) tools for the user to explicitly specify interest in a given image included on the web page. Example GUI tools include, but are not limited to, a pointing tool, a highlighting tool, an area indictor tool, and the like. Whatever the particular way to detect user interest in an image, the detection comprises identifying the user's spatial attention to a specific portion of the displayed web page. Once a user interested image is detected, the browser plugin module 322 receives the user interested image, which then comprises the query image that may be automatically applied to the matching phase 401B as described above.

In this manner, image feature data extraction and uses of the image feature data are disclosed herein. In an indexing phase, registered trademark images are accessed and indexing is performed on the trademark images to extract their image features and attributes, and populate an image index database in which the trademark images are indexed by their image features and item categories. Extracted image features include, but are not limited to, a color histogram, and an oriented gradients histogram. In a search phase (also referred to as a matching phase), the information in the image index database is accessed when a non-inventory image is received (also referred to as a query image) in order to provide matches or most similar registered trademark images corresponding to the query image. The query image may be provided by a user uploading, pointing to, emailing, messaging, or otherwise transferring or providing an image file. In some embodiments, a photo of an image, or an image included in a (non-affiliated) website or web page comprises an input or query image. Search results comprise registered trademarks that best match the query image.

In another embodiment, user selection or preference for certain of the trademarks or associated information provided in the search results is used to re-order or re-rank the listing order of the trademarks within the results. User's interest in an image included in a website/web page may also be used as the input, sample, or query image to return search results corresponding to that image.

It is contemplated that alternative embodiments for uses of the image feature data, feature extraction, and performing matching are possible. For example:

- Automatically check a newly designed logo, shape, lettering, color, symbol, or other input query image for similar images registered as trademarks in worldwide databases.
- Automatically detect registered trademarks for infringement.
- Additional or different filters may be applied for feature extraction.
- Apply different distance functions to determine which distance function works best in a class-specific sense (minimizes the distance between similar items while maximizing distance between dissimilar ones).

Thus, the present invention provides a highly improved trademark image search and retrieval method, system, and computer product for automatically extracting feature data, comparing features and images, retrieving images and associated data, etc., with greatly improved speed, efficiency, and accuracy. Surprisingly, in extracting both the color features and the shape features, the present invention utilizes filtering, data reduction, courser segmentation, and reduced binning to increase both processing efficiency and accuracy of image comparison for large sets of trademark-type images (on the order of thousands to millions).

Figure 9:
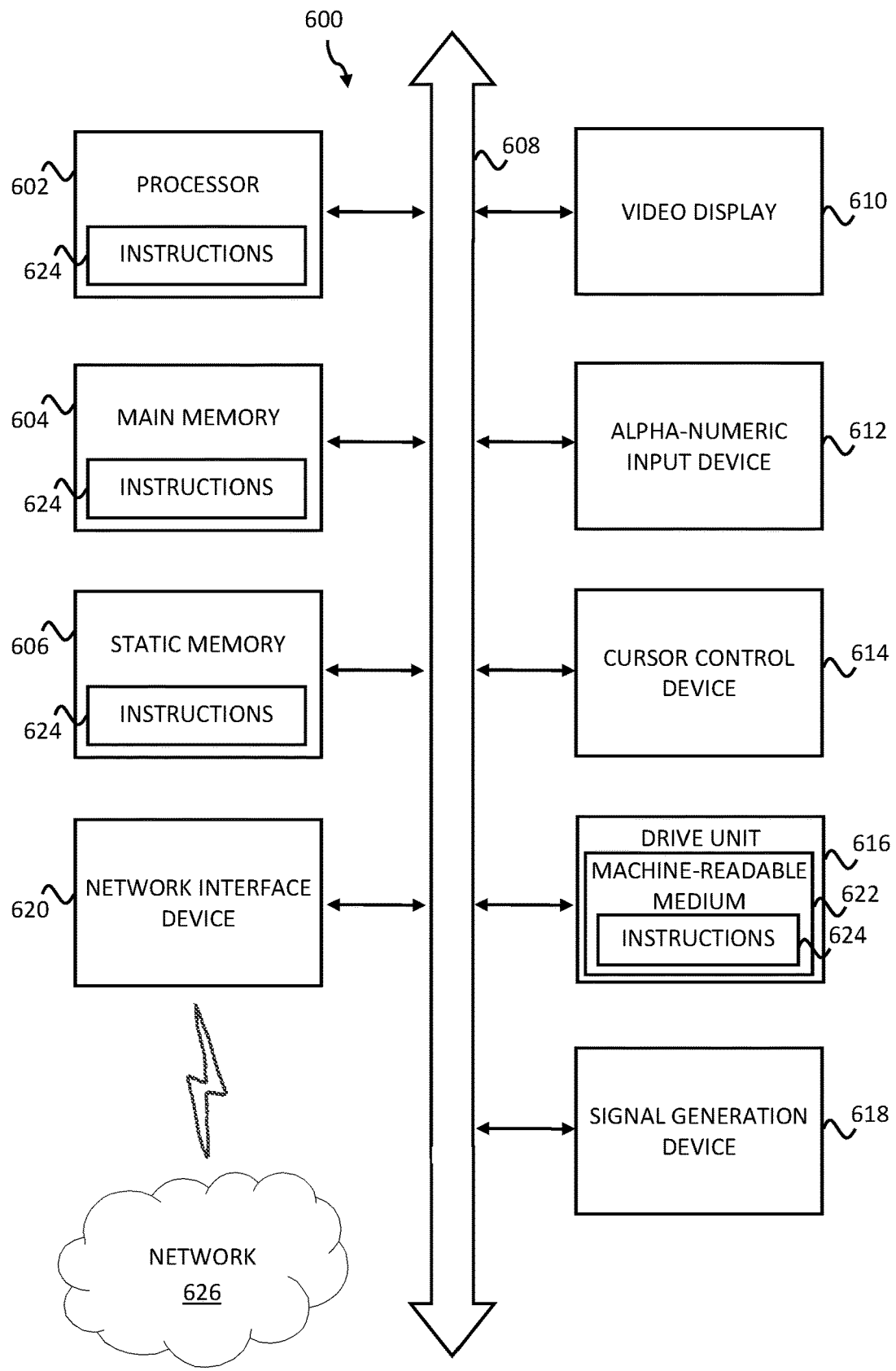
FIG. 9 illustrates a diagrammatic representation of a machine in the example form of a computer system within which a set of instructions, for causing the machine to perform any one or more of the methodologies of FIGS. 4-7 according to some embodiments.

FIG. 9 shows a diagrammatic representation of a machine in the example form of a computer system 600 within which a set of instructions, for causing the machine to perform any one or more of the methodologies discussed herein, may be executed. The computer system 600 comprises, for example, any of the device machine 110, applications servers 116, API server 112, web server 114, database servers 122, or third party server 126. In alternative embodiments, the machine operates as a standalone device or may be connected (e.g., networked) to other machines. In a networked deployment, the machine may operate in the capacity of a server or a device machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystal display (LCD), organic light emitting diode (OLED), touch screen, or a cathode ray tube (CRT)). The computer system 600 also includes an alphanumeric input device 612 (e.g., a physical or virtual keyboard), a cursor control device 614 (e.g., a mouse, a touch screen, a touchpad, a trackball, a trackpad), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment.

Embodiments of the present invention may be embodied as a system, method, or computer program product (e.g., embodiments directed toward an image searching system, method, or computer program product). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". For example, an image searching method may be embodied in a software and hardware system that can be housed in a portable device such as a tablet, laptop, camera, phone, and the like. In another example, a client and server computer in operable communication and combination, may be in its entirety said to be embodied in a system. Furthermore, aspects of the present embodiments of the disclosure may take the form of a computer program product embodied in one or more computer readable medium/media having computer readable program code embodied thereon. Methods may be implemented in a special-purpose computer or a suitably programmed general-purpose computer.

Any combination of one or more computer readable medium/media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described above with reference to flowchart illustrations and/or block diagrams of methods, apparatus (systems) and computer program products according to embodiments of the present invention (e.g., FIGS. 1-9). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the invention has been described in detail in connection with only a limited number of embodiments, it should be readily understood that the invention is not limited to such disclosed embodiments. Rather, the invention can be modified to incorporate a number of variations, alterations, substitutions, combinations or equivalent arrangements not heretofore described, but which are commensurate with the spirit and scope of the invention. For example, the use of different filters, and the order of histogram generation are within the scope of the present invention. Furthermore, the various components that make up the image searching system, apparatus, and methods disclosed above can be alternatives which may be combined in various applicable and functioning combinations within the scope of the present invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The invention claimed is:

1. A method for content based search and retrieval of trademark images, the method comprising:
    extracting color features from a plurality of trademark images using a reduced color segmentation by generating, with a processor, a non-weighted 64-bin color histogram for each trademark image using 6-bit color data for each pixel of the trademark image, wherein the 6-bit color data includes 2 most significant bits from each of a red, green, and blue channel for each pixel of the trademark image;
    extracting shape features from a plurality of trademark images by forming a courser segmentation by dividing each of the trademark images into 3×3 blocks and generating, with the processor, a 9-bin orientation histogram for each of the courser segmentation using weighted orientation angle data for each pixel in each segmentation;
    generating, by the processor, distance similarity measures between a query trademark image and a set of trademark images by comparing color features and shape features between the query trademark image and each trademark image of the set of trademark images using the reduced color segmentation and courser segmentation,
    wherein the distance similarity measures are useable to locate candidate trademark images from said set of trademark images that are similar to the query trademark image to thereby enable retrieval of the trademark images.

2. The method according to claim 1, wherein extracting color features further includes:
    applying a first filter to smooth the trademark image; and
    removing background pixels from the trademark image.

3. The method according to claim 2, wherein extracting shape features further includes:
    converting the trademark image to grayscale;
    applying a third filter to remove noisy pixels from the trademark image;
    calculating a horizontal derivative and a vertical derivative for each pixel of the trademark image;
    dividing the vertical derivative by the horizontal derivative to obtain a derivative quotient for each pixel of the trademark image; and
    calculating an orientation angle for each pixel of the trademark image by calculating arctangent of the derivative quotient.

4. The method according to claim 1, wherein extracting shape features further includes:
    extracting a 9-bin shape histogram for each block of the image using orientation angle data with weighted values to obtain an 81-bin shape histogram of the image.

5. The method according to claim 1, wherein 9 bins of the 9-bin orientation histogram include 0-20 degrees, 20-40 degrees, 40-60 degrees, 60-80 degrees, 80-100 degrees, 100-120 degrees, 120-140 degrees, 140-160 degrees, and 160-180 degrees.

6. The method according to claim 1, wherein the distance similarity measure is a Bhattacharyya distance.

7. The method according to claim 1, further comprising:
    generating distance similarity measures between a query trademark image and a set of trademark images by comparing color features and shape features between the query trademark image and each trademark image of the set of trademark images using Bhattacharyya distance.

8. The method according to claim 1, further comprising:
displaying on a display, trademark images from the set of trademark images in an order according to Bhattacharyya distance.

9. A method for content based searching and retrieval of trademark images, the method comprising:
providing a URL of a set of trademark images in a database;
receiving a query trademark image;
extracting color features from each of the trademark images using a reduced color segmentation, by a processor, the extracting of the color features including:
applying a first filter to smooth the image;
removing background pixels of the image;
concatenating 2 most significant bits from each of a red, green, and blue channel to provide 6-bit color data for each pixel of the image, thereby providing a reduced color segmentation; and
extracting a non-weighted 64-bin color histogram of the image using the 6-bit color data;
extracting shape features from each of the trademark images using a courser segmentation, by the processor, the extracting of the shape features including:
converting the image to grayscale;
removing noisy pixels from the image;
calculating a horizontal derivative and a vertical derivative for each pixel of the image;
dividing the vertical derivative by the horizontal derivative to obtain a derivative quotient for each pixel of the image;
calculating an orientation angle for each pixel of the image by calculating arctangent of the derivative quotient;
dividing the image into 3×3 blocks; and
extracting a 9-bin shape histogram for each block of the image using orientation angle data with weighted values to obtain an 81-bin shape histogram of the image, wherein the 9 bins of the shape histogram include 0-20 degrees, 20-40 degrees, 40-60 degrees, 60-80 degrees, 80-100 degrees, 100-120 degrees, 120-140 degrees, 140-160 degrees, and 160-180 degrees;
determining similarity between the query trademark image and the set of trademark images by comparing color features and shape features between the query trademark image and each trademark image of the set of trademark images using the reduced color segmentation, courser segmentation, and Bhattacharyya distance; and
returning trademark images from the set of trademark images in an order according to Bhattacharyya distance.

10. A non-transitory machine-readable storage medium comprising instructions that, when executed by one or more processors of a machine, cause the machine to perform operations comprising:
extracting color features from a trademark image using a reduced color segmentation by generating a non-weighted 64-bin color histogram of the trademark image using 6-bit color data for each pixel of the trademark image, wherein the 6-bit color data includes 2 most significant bits from each of a red, green, and blue channel for each pixel of the trademark image;
extracting shape features from the trademark image by forming a courser segmentation by dividing the trademark image into 3×3 blocks and generating a 9-bin orientation histogram for each of the courser segmentation using weighted orientation angle data for each pixel in each segmentation; and
generating a distance similarity measure comparing the color features and the shape features between two trademark images using the reduced color segmentation and courser segmentation.

11. The non-transitory machine-readable storage medium of claim 10, wherein the extracting of color features further includes:
applying a first filter to smooth the trademark image; and
removing background pixels from the trademark image.

12. The non-transitory machine-readable storage medium according to claim 10, wherein the extracting of shape features further includes:
converting the trademark image to grayscale;
removing noisy pixels from the trademark image;
calculating a horizontal derivative and a vertical derivative for each pixel of the trademark image;
dividing the vertical derivative by the horizontal derivative to obtain a derivative quotient for each pixel of the image; and
calculating an orientation angle for each pixel of the image by calculating arctangent of the derivative quotient.

13. The non-transitory machine-readable storage medium according to claim 10, wherein the extracting of shape features further includes:
extracting a 9-bin shape histogram for each block of the image using orientation angle data with weighted values.

14. The non-transitory machine-readable storage medium according to claim 10, wherein 9 bins of the 9-bin orientation histogram include 0-20 degrees, 20-40 degrees, 40-60 degrees, 60-80 degrees, 80-100 degrees, 100-120 degrees, 120-140 degrees, 140-160 degrees, and 160-180 degrees.

15. The non-transitory machine-readable storage medium according to claim 10, wherein the distance similarity measure is a Bhattacharyya distance.

16. The non-transitory machine-readable storage medium according to claim 10, that cause the machine to perform operations further comprising:
generating distance similarity measures between a query trademark image and a set of trademark images by comparing color features and shape features between the query trademark image and each trademark image of the set of trademark images using Bhattacharyya distance.

17. The non-transitory machine-readable storage medium according to claim 10, that cause the machine to perform operations further comprising:
returning trademark images from the set of trademark images in an order according to Bhattacharyya distance.

18. A system for content based searching and retrieval of trademark images, the system comprising:
one or more processors;
a color histogram module that configures at least one processor among the one or more processors to generate a non-weighted 64-bin color histogram of a trademark image using 6-bit color data for each pixel of a trademark image, wherein the 6-bit color data includes 2 most significant bits from each of a red, green, and blue channel for each pixel of the trademark image to provide a reduced color segmentation;

an orientation histogram module that configures at least one processor among the one or more processors to divide the trademark image into 3×3 blocks and generate a 9-bin orientation histogram using weighted orientation angle data for each pixel in each segmentation to provide a courser segmentation; and a comparison module that configures at least one processor among the one or more processors to generate a distance similarity measure comparing the color histogram and the orientation histogram between two trademark images using the reduced color segmentation and courser segmentation.

19. The system according to claim 18, wherein the color histogram module configures the at least one processor to:
apply a first filter to smooth the trademark image; and
apply a second filter to remove background pixels from the trademark image.

20. The system according to claim 18, wherein the orientation histogram module configures the at least one processor to:
convert the trademark image to grayscale;
removing noisy pixels from the trademark image;
calculate a horizontal derivative and a vertical derivative for each pixel of the trademark image;
divide the vertical derivative by the horizontal derivative to obtain a derivative quotient for each pixel of the image; and
calculate an orientation angle for each pixel of the image by calculating arctangent of the derivative quotient.

21. The system according to claim 18, wherein the orientation histogram module configures the at least one processor to:
extract a 9-bin shape histogram for each block of the image using the orientation angle data with weighted values to obtain an 81-bin shape histogram of the image.

22. The system according to claim 18, wherein 9 bins of the 9-bin orientation histogram include 0-20 degrees, 20-40 degrees, 40-60 degrees, 60-80 degrees, 80-100 degrees, 100-120 degrees, 120-140 degrees, 140-160 degrees, and 160-180 degrees.

23. The system according to claim 18, wherein the comparison module configures the at least one processor to generate a distance similarity measure that is a Bhattacharyya distance.

24. The system according to claim 18, wherein the comparison module configures the at least one processor to generate distance similarity measures between a query trademark image and a set of trademark images by comparing color features and shape features between the query trademark image and each trademark image of the set of trademark images using Bhattacharyya distance.

25. The system according to claim 18, further comprising:
an image retrieval module that configures at least one processor among the one or more processors to return trademark images from a set of trademark images in an order according to Bhattacharyya distance.

26. The system according to claim 18, further comprising:
a display for displaying retrieved trademark images from a set of trademark images in an order according to Bhattacharyya distance.

27. The system according to claim 18, further comprising a capture module configured to receive a trademark or trademark image from a device communicatively coupled to the system.

* * * * *